United States Patent [19]
Weaver

[11] Patent Number: 4,778,366
[45] Date of Patent: Oct. 18, 1988

[54] MOLDING APPARATUS FOR FORMING AN INTEGRAL WINDSHIELD GASKET AND LEAF SCREEN ASSEMBLY

[75] Inventor: William R. Weaver, Toledo, Ohio

[73] Assignee: Libbey-Owens-Ford Co., Toledo, Ohio

[21] Appl. No.: 27,898

[22] Filed: Mar. 19, 1987

Related U.S. Application Data

[62] Division of Ser. No. 812,727, Dec. 23, 1985, abandoned.

[51] Int. Cl.$^4$ .............................................. B29C 45/14
[52] U.S. Cl. ...................................... 425/110; 249/83; 249/85; 249/95; 264/252; 264/254; 264/255; 425/117; 425/127; 425/129.1
[58] Field of Search ..................... 249/83, 85, 95, 122; 425/110, 116, 117, 127, 129 R, 577; 264/252, 254, 255

[56] References Cited

U.S. PATENT DOCUMENTS

| | | | |
|---|---|---|---|
| 3,353,220 | 11/1967 | Lenoble | 249/85 |
| 3,443,005 | 5/1969 | Braun | 425/127 |
| 3,456,913 | 7/1969 | Lutz | 425/577 |
| 3,481,002 | 12/1969 | Dreps | 425/577 |
| 4,044,984 | 8/1977 | Shimizu et al. | 249/95 |
| 4,157,883 | 6/1979 | Mares | 425/127 |
| 4,470,784 | 9/1984 | Piotrovsky | 425/127 |
| 4,489,018 | 12/1984 | Ball | 425/117 |
| 4,584,155 | 4/1986 | Zanella | 425/127 |
| 4,626,185 | 12/1986 | Monnet | 249/83 |

Primary Examiner—Jay H. Woo
Assistant Examiner—C. Scott Bushey
Attorney, Agent, or Firm—Marshall & Melhorn

[57] ABSTRACT

A window assembly includes a windshield and a gasket formed by curing a polymeric gasket material in situ on the windshield to encapsulate a marginal peripheral edge thereof and form an integral leaf screen and mounting tab. The gasket is formed in a mold with the windshield typically by a reaction injection molding process. The gasket-forming cavities in the mold can be separated by removable plugs and be connected to multiple inlet means for separately filling the cavities. The gasket, leaf screen and mounting tab can be formed of one material, or the leaf screen and tab can be formed of a different material than the gasket.

4 Claims, 2 Drawing Sheets

MOLDING APPARATUS FOR FORMING AN INTEGRAL WINDSHIELD GASKET AND LEAF SCREEN ASSEMBLY

This application is a division of application Ser. No. 812,727, filed Dec. 23, 1985, now abandoned.

BACKGROUND OF THE INVENTION

The present invention relates generally to a window assembly and to a process for producing the assembly, and more particularly to a windshield assembly for a vehicle including a glass viewing area having a gasket formed along at least one edge thereof including an integral leaf screen.

Initially, fixed window assemblies for vehicles were comprised of a plurality of elements including adhesive sealants applied around the marginal edges of the window, suitable mechanical fasteners such as metal clips, and exterior decorative trim strips disposed to cover the junction between the marginal edges of the window and the adjacent portions of the vehicle frame. Such window structures were costly, especially from a labor standpoint, since it was necessary to assemble the individual elements along the vehicle assembly line.

Subsequently, in an endeavor to improve the above window structure, unitary window assemblies of the type illustrated in U.S. Pat. No. 4,072,340 were developed. These assemblies included a sheet of glass, an adjacent frame, and a casing or gasket of molded material, such as polyvinylchoride, extending between the frame and the peripheral edge of the window to hold the sheet of glass and the frame together. Fasteners were provided at spaced locations along the frame such that the entire assembly could be guided into location over the opening in a vehicle body as a unit. Other types of unitary window assemblies are disclosed in U.S. Pat. Nos. 3,759,004 and 4,364,595. While such unitary window structures greatly reduce the time required to mount the window assembly in the associated vehicle, such structures are relatively costly, since the individual components required to produce each window assembly generally must be manually assembled.

SUMMARY OF THE INVENTION

The present invention relates to a window assembly and a method of making the same including a mold structure for forming a gasket around a predetermined portion of a frangible sheet or sheets of transparent material, such as glass, to produce a unitary window assembly. In the preferred embodiment of the invention, the gasket is formed by polymerizing and curing a gasket forming material in situ on the glass sheet to encapsulate the marginal peripheral edge portion thereof. The gasket is typically formed by a reaction injection molding process.

More specifically, the mold structure includes at least two cooperating mold sections each having a recessed portion formed therein in facing relationship to one another. The recessed portions cooperate to define a sheet receiving chamber for receiving a vehicle windshield structure, for example a single sheet of heat strengthened glass or, as is more often the case, a laminated assembly of two glass sheets integrally bonded together through an interposed layer of plastic, e.g., polyvinyl butyral. A compressible seal means is positioned about at least a portion of the periphery of the chamber and functions to resiliently support the windshield within the chamber. Each mold section includes a metallic main body portion, and the seal means maintains the windshield in spaced-apart relationship with the main body portions of the mold sections to prevent any glass-to-metal contact between the glass and the metallic mold sections.

Also, the seal means cooperates with predetermined portions of the windshield and the mold sections for defining a gasket cavity having a configuration corresponding to the gasket to be formed on the windshield. At least portions of the facing surfaces of mold sections disposed outwardly of the gasket forming cavity are in metal-to-metal contact with one another. This enables the amount the seal means is compressed and the dimensions of the gasket to be precisely controlled. Inlet means or gates are provided for introducing a flowable gasket forming material into the gasket cavity.

The window assembly also includes an integral leaf screen and locator tab which replaces the prior art separate leaf screens at the base of the windshield. The leaf screen is attached to the window glass by a gasket portion formed at the same time and in the same manner as the sealing gaskets on the window. The gaskets and the leaf screen can be formed of different materials by use of a plug to block off one area of the mold while the forming material is being injected in the other area of the mold.

BRIEF DESCRIPTION OF THE DRAWINGS

The above, as well as other advantages of the present invention, will become readily apparent to those skilled in the art from the following detailed description of a preferred embodiment when considered in the light of the accompanying drawings, in which.

DESCRIPTION OF THE PREFERRED EMBODIMENT

Figure 1:
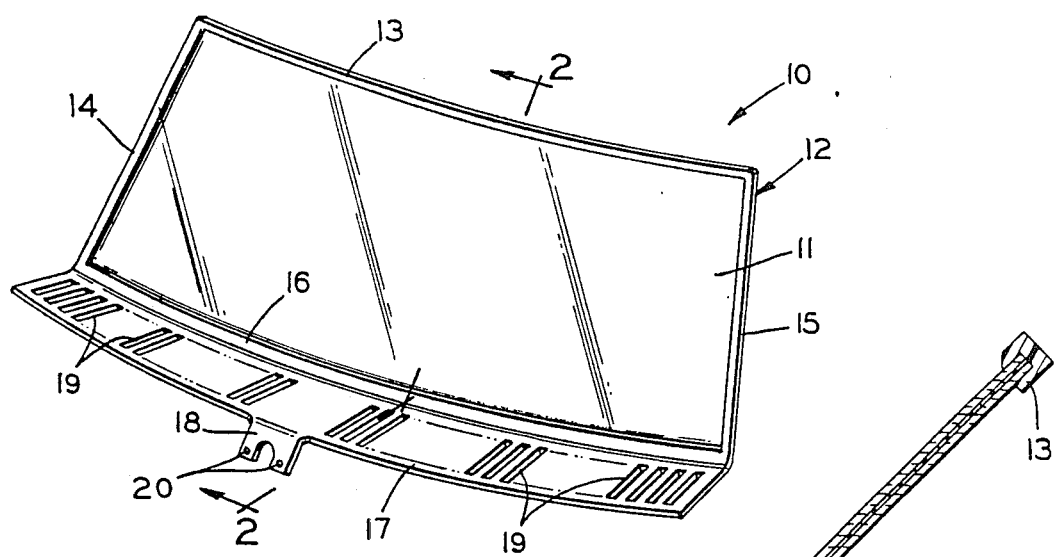
FIG. 1 is a perspective view of a window assembly according to the present invention.

There is shown in FIG. 1 a window assembly 10, according to the present invention, including a windshield 11, illustrated herein as including a pair of glass sheets and an interposed layer of polyvinyl butyral integrally bonded to the sheets, having its peripheral edges encapsulated by a gasket 12. The gasket 12 includes a top portion 13, side portions 14 and 15, and bottom portion 16 which portions completely encapsulate the peripheral edges of the windshield 11. Attached to the bottom portion 16 is an integral leaf screen 17 and a locating tab means 18 extends from a front edge of the leaf screen 17. The leaf screen 17 replaces the prior art leaf screens which were typically formed of wire mesh, stamped steel or molded rigid plastic. These screens are utilized to prevent debris from falling into the engine compartment between the hood and body of those vehicles having windshield wipers mounted in that area. In order to provide for the passage of air between the exterior of the vehicle and the engine compartment, a plurality of elongated slots or apertures 19 are typically formed in the leaf screen 17.

Figure 2:
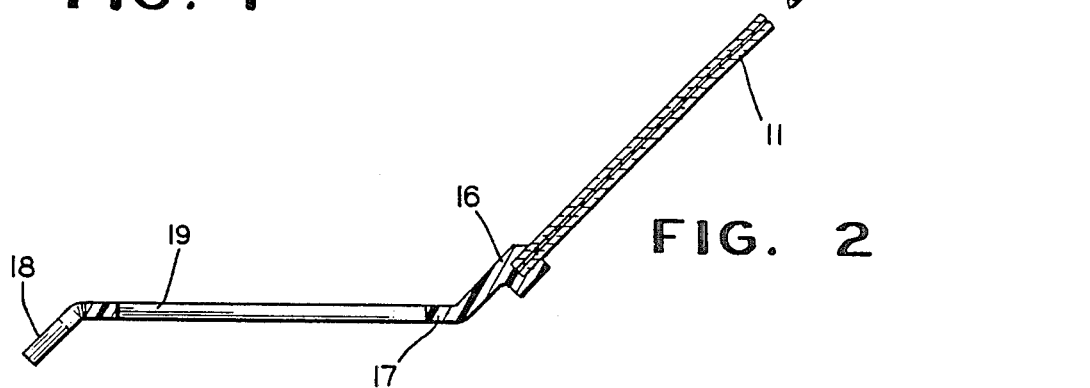
FIG. 2 is an enlarged fragmentary sectional view of the window assembly of FIG. 1 taken along the line 2—2 thereof.

Referring to FIGS. 1 and 2, the gasket portions 13, 14, 15 and 16 completely encapsulate the peripheral edge of the windshield 11 to provide a seal against the intrusion of fluids between the windshield and the frame of the vehicle in which it is installed. Thus, the window assembly 10 is typically fitted into an opening in the vehicle and the gasket 12 is secured to the vehicle with a suitable adhesive. The leaf screen 17 is formed integral with the remaining portions of the gasket 12 and at the proper angle such that it fills an opening between the body of the vehicle and the hood of the vehicle. The tab means 18 can include one or more apertures 20 for receiving fastening means to secure the leading edge of the leaf screen, typically to the body of the vehicle.

Figure 3:
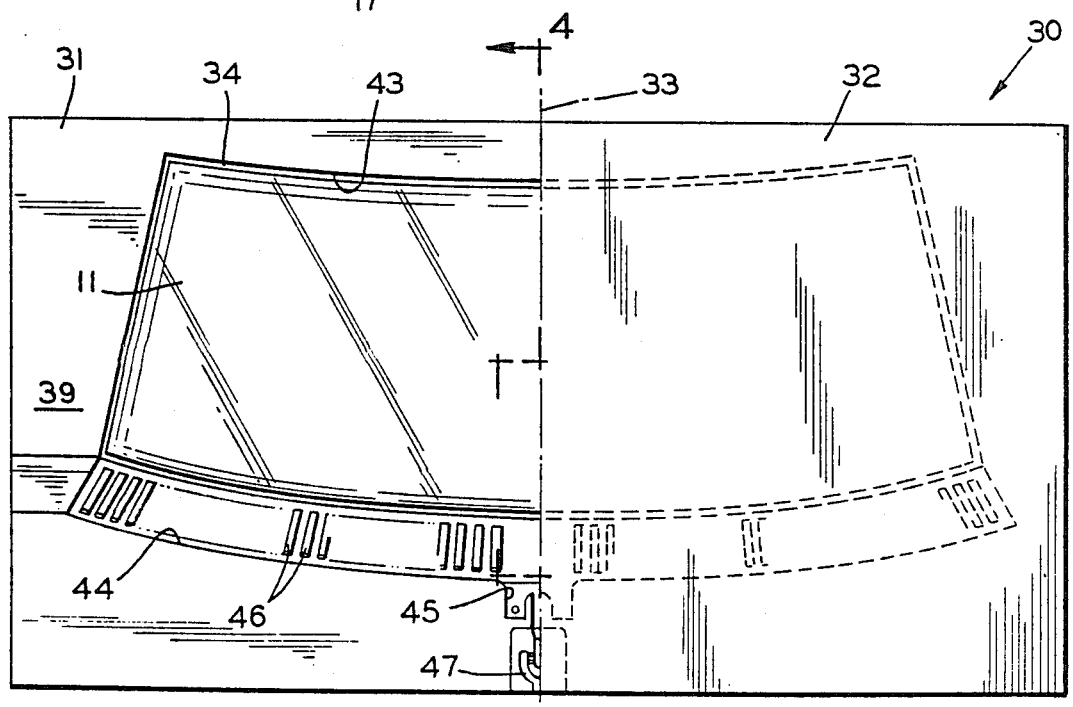
FIG. 3 is a top plan view of a mold structure for fabricating the window assembly of FIG. 1 according to the present invention with a portion of the upper half of the mold cut away.
Figure 4:
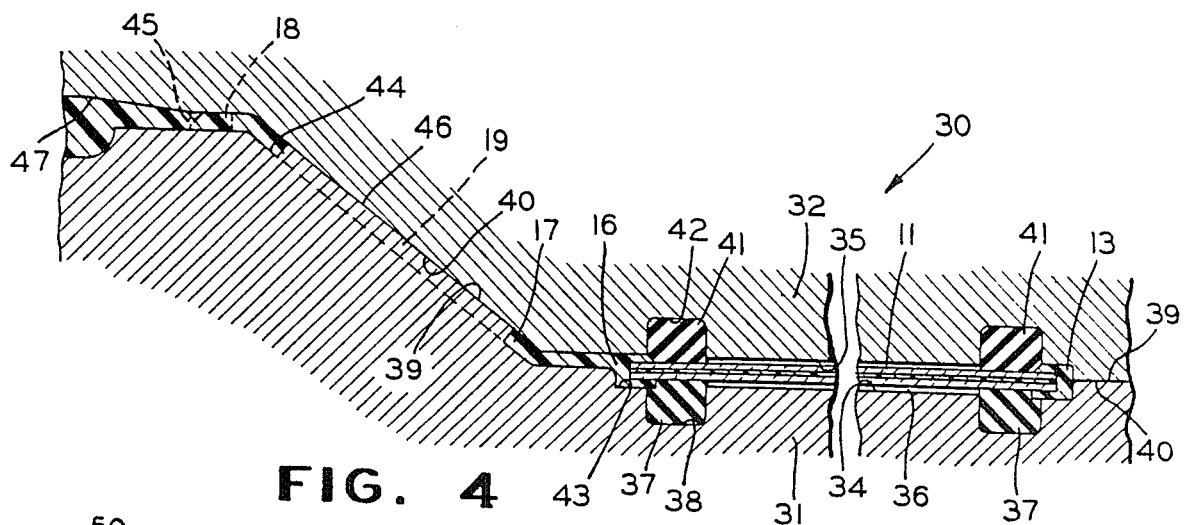
FIG. 4 is an enlarged fragmentary sectional view of the window assembly and mold structure of FIG. 3 taken along the line 4—4 thereof.

Referring to FIGS. 3 and 4, there is shown a mold 30 for making a windshield assembly in accordance with the present invention. The mold 30 is formed of a lower section 31 and an upper section 32 (half of which has been cut away along a center line 33 for illustration purposes). While the mold sections 31 and 32 are typically formed of a metallic material such as steel or aluminum, for example, other types of substantially non-resilient, rigid material can be used. Suitable means, not shown, are provided to open and close the mold sections 31 and 32. Also, each of the mold sections 31 and 32 can be provided with passageways (not shown) for circulating a suitable coolant through the respective mold sections.

The mold sections 31 and 32 are provided with recessed portions 34 and 35 respectively in facing relationship to one another such that, when the mold sections are closed, the recessed portions 34 and 35 cooperate to define a windshield receiving or glass clearance chamber 36 for receiving windshield 11 on which a gasket is to be formed. When the mold sections are open, the windshield 11 is positioned on the lower section 31 so that the outer peripheral portion of the lower surface of the glass rests on a resilient lower seal 37 positioned within a groove 38 formed in the upper surface of the lower section 31.

After the windshield 11 is suitably positioned on the seal 37 of the lower mold section 31, the upper mold section 32 is lowered into position to enable the outer peripheral portions of the facing surfaces 39 and 40 of the cooperating mold sections 31 and 32 respectively to be clamped together in a metal-to-metal contact, as shown in FIG. 4. The upper mold section 32 carries a resilient upper seal 41 positioned in a groove 42 formed opposite the groove 38. The upper seal 41 cooperates with the lower seal 37 to press yieldingly against the windshield 11 and resiliently support the windshield within the glass clearance chamber 36.

The chamber 36 of the mold 30 is slightly larger than the formed windshield 11 to avoid any glass-to-metal contact between the windshield 11 and the metallic mold sections 31 and 32. However, it will be appreciated that the glass clearance chamber 36 can be formed of any shape as long as the chamber is sufficiently large to avoid any glass-to-metal contact between the windshield and the metallic mold sections. For example, the portions of the mold sections 31 and 32 which are below and above the central portions of the windshield 11 can be removed such that each mold section will be generally ring-shaped. The seals 37 and 41 are preferably formed of a silicone rubber material and secured within the respective grooves 38 and 42 by means of a suitable adhesive. Alternatively, the seals 37 and 41 can be releasably secured within the respective grooves. This can be accomplished by providing tab portions (not shown) in spaced apart locations around the respective seal which can be inserted and releasably held within corresponding tab receiving apertures (not shown) formed at corresponding spaced apart locations around the respective groove.

In addition to resiliently supporting the windshield 11 within the glass clearance chamber 36, the seals 37 and 41 cooperate with select portions of the windshield 11, and the mold sections 31 and 32 for defining the gasket forming cavity utilized to form the gaskets 13, 14, 15 and 16. More specifically, these gasket forming cavities include a lower cavity 43 which extends completely around the outer periphery of each of the lower seal 37 and the upper seal 41 for forming the top portion 13, side portions 14 and 15, and bottom portion 16 of the gasket 12. A middle or central cavity 44 for forming the leaf screen 17, and an upper cavity 45 for forming the tab means 18 are connected to the lower cavity 43. The apertures 19 are formed in the leaf screen 17 by elongated pins 46 extending upwardly from the lower section 31 of the mold which pins 46 are in metal-to-metal contact with the upper section 32 of the mold.

The cavities 43, 44 and 45 communicate with an inlet means or gate 47 for receiving a flowable gasket forming material from a nozzle member (not shown). The gasket forming material is introduced through the inlet means or gate 47 and flows into the upper cavity 45, then into the middle cavity 44, and finally into the lower cavity 43 completely surrounding the peripheral edges of the windshield 11. Typically, the gasket forming material is composed of a flowable multi-constituent material such as polyurethane, e.g., composed of a polyol resin constituent, an isocyanate constituent, and a catalyst, adapted to polymerize and cure in situ on the peripheral portion of the windshield 11. The gasket is preferably formed by a reaction injection molding process involving low pressures suitable for use with frangible substrates such as glass. Materials which have been utilized to form suitable gaskets include Bayflex 110-80 and Bayflex 110-50 manufactured by Mobay Chemical Corporation of Pittsburgh, Pa.

As shown in FIG. 4, the mold sections 31 and 32 include facing surfaces 39 and 40, respectively, which are in contact with one another outwardly of the gasket forming cavities, as well as at pins 46, to define a parting line. Since the windshield 11 is relatively fragile, it is important to control the amount that the seals 37 and 41 are compressed to avoid fracturing the glass. By enabling the two mold sections to come together in metal-to-metal contact, the amount the seals 37 and 41 are compressed can be controlled. Also, the metal-to-metal contact of the mold sections 31 and 32 enables the width of the gasket forming cavities 43, 44 and 45 to be precisely controlled.

Figure 5:
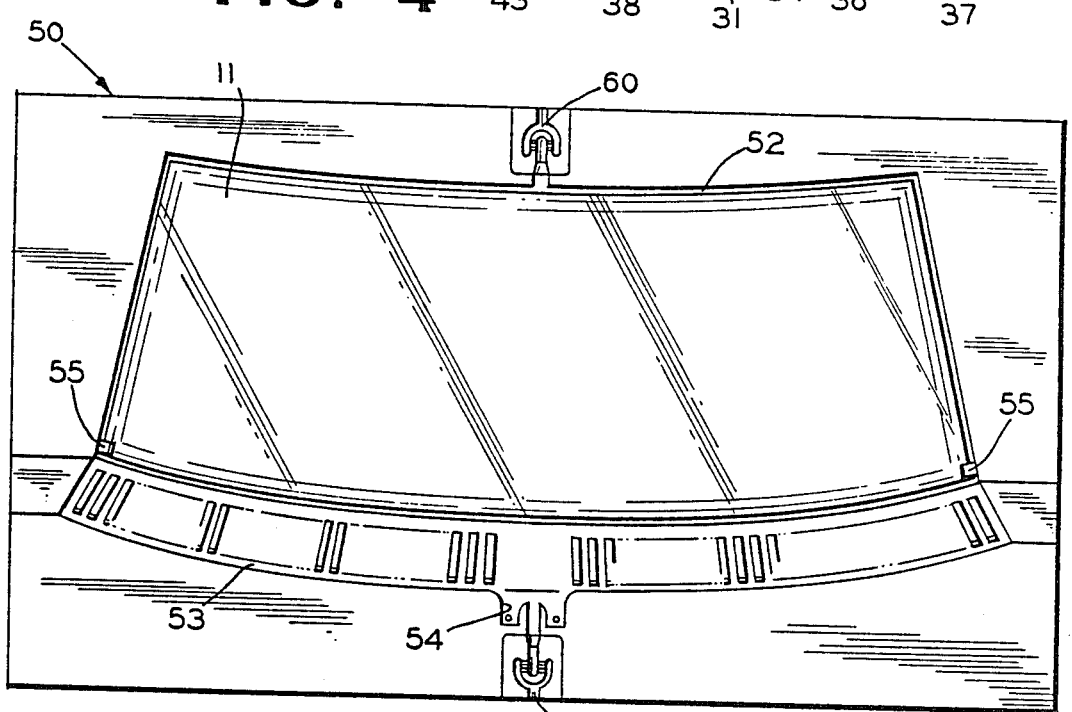
FIG. 5 is a top plan view of the lower half of an alternate embodiment of the mold structure in FIG. 3.
Figure 6:
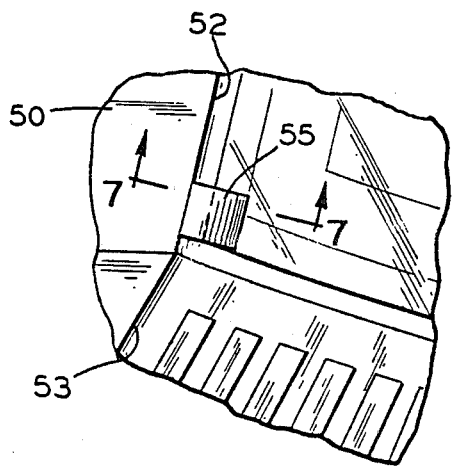
FIG. 6 is an enlarged fragmentary view of a portion of the mold structure of FIG. 5.
Figure 7:
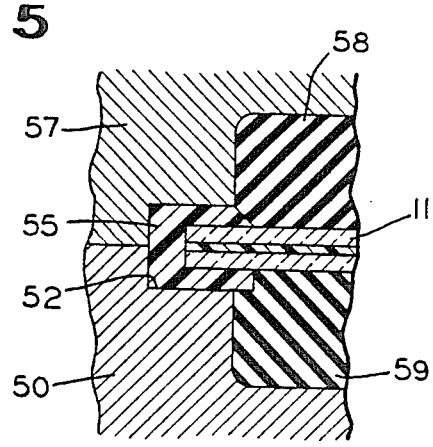
FIG. 7 is an enlarged fragmentary sectional view of the mold structure of FIG. 5 as if taken along the line 7—7 in FIG. 6.

There is shown in FIG. 5 an alternate embodiment of a window assembly mold according to the present invention. A lower mold section 50 is shown as having an inlet means or gate 51, a lower cavity 52, a middle cavity 53, and an upper cavity 54 which are similar to the inlet means 47, the lower cavity 43, the middle cavity 44 and the upper cavity 45 of the lower mold section 31 shown in FIG. 3. The mold 50 is utilized to form the gasket in a two step process. A pair of plugs 55 can be positioned between the lower cavity 52 and the middle cavity 53. FIG. 6 is an enlarged fragmentary view of a portion of the mold 50 showing the connection of the cavities 52 and 53 and the position of one of the plugs 55. FIG. 7 is a fragmentary enlarged sectional view taken along the line 7—7 in FIG. 6, but with an upper mold section 57 in place and showing upper and lower seals 58 and 59, respectively. The plug 55 fits over the lower edge of the windshield 11 and is preferably formed of a resilient material with a cross section corresponding to that of the cavity 52 so as to completely segregate it from the cavities 53 and 54.

The cavities 53 and 54 can be filled with molding material through the inlet means 51. A second inlet means 60 is connected to the lower cavity 52 on the opposite side of the lower mold section 50 from the inlet means 51. After the cavities 53 and 54 have been filled, the two plugs 55 are pulled from the mold and molding material is injected into the inlet means 60 to fill the cavity 52 and integrate that portion of the gasket with the leaf screen and tab means formed by the cavities 53 and 54 respectively. In this manner, two different molding materials can be utilized, for example, two different polyurethane formulations with a softer material used around the glass sheet and a harder material used for the leaf screen.

Also, a thermoplastic such as polyvinylchloride could be utilized for the leaf screen. Since this material is not suitable as a gasket, the plugs 55 would be replaced with a plug running the full length of the bottom of the glass sheet 11 to block off that area for later filling with a gasket forming material.

Alternatively, the cavity 52 could be filled through the inlet means 60 and then the plugs 55 could be pulled before the cavities 53 and 54 are filled through the inlet means 51. In either case, such an arrangement could be utilized where it is difficult to obtain a uniform gasket by filling all three cavities through a single inlet means.

In accordance with the provisions of the patent statutes, the principle and mode of operation of the present invention have been described in what has been considered to represent the preferred embodiment. However, it should be understood that the invention may be practiced otherwise than as specifically illustrated and described without departing from its spirit or scope.

I claim:

1. A mold structure for producing a window assembly including at least one transparent sheet, a first gasket member adhered to a first peripheral portion of the sheet, and a second gasket member formed as a leaf screen adhered to a second peripheral portion of the sheet and to the first gasket member, said mold structure comprising:

at least two cooperating mold sections having facing surfaces defining a chamber for receiving the sheet, at least one of the facing surfaces of said mold sections provided with a gasket shaping portion which cooperates with said first peripheral portion of the sheet to define a first gasket forming cavity corresponding to the first gasket member to be formed on the sheet and cooperating with said second peripheral portion of the sheet to define a second gasket forming cavity corresponding to the second gasket member to be formed; a removable plug adapted to block the flow of flowable gasket forming material between said first and second gasket forming cavities, said removable plug disposed entirely within the confines of said first gasket forming cavity; and inlet means for introducing a flowable gasket forming material into said first and second gasket forming cavities when the mold sections are in contact relationship.

2. The mold structure according to claim 1 wherein said inlet means includes a first inlet means connected to said first gasket forming cavity and a second inlet means connected to said second gasket forming cavity.

3. A mold structure for producing a window assembly including at least one transparent sheet, a first gasket member adhered to the peripheral portion of the sheet, and a second gasket member formed as a leaf screen adhered to the first gasket member, said mold structure comprising:

at least two cooperating mold sections having facing surfaces defining a chamber for receiving the sheet, at least one of the facing surfaces of said mold sections provided with a gasket shaping portion which cooperates with the peripheral portion of the sheet to define a first gasket forming cavity corresponding to the first gasket member to be formed on the sheet and cooperating with a portion of the first gasket member to define a second gasket forming cavity corresponding to the second gasket member to be formed; means adapted to block the flow of flowable gasket forming material between said first and second gasket forming cavities, said means disposed entirely within the confines of said second gasket forming cavity; and inlet means for introducing a flowable gasket forming material into the first and second gasket forming cavities when the mold sections are in contact relationship.

4. The mold structure according to claim 3 wherein said inlet means includes a first inlet means connected to said first gasket forming cavity and a second inlet means connected to said second gasket forming cavity.

* * * * *